(12) United States Patent
Cheng et al.

(10) Patent No.: US 8,222,585 B2
(45) Date of Patent: Jul. 17, 2012

(54) THREE-DIMENSIONAL POSITION DETECTING DEVICE AND METHOD FOR USING THE SAME

(75) Inventors: Chia-Chu Cheng, Yonghe (TW);
Jau-Yu Chen, Taipei (TW);
Chih-Cheng Kuan, Taipei (TW)

(73) Assignee: Lite-On Semiconductor Corp., Taipei Hsien (TW)

( * ) Notice: Subject to any disclaimer, the term of this patent is extended or adjusted under 35 U.S.C. 154(b) by 1094 days.

(21) Appl. No.: 12/122,770

(22) Filed: May 19, 2008

(65) Prior Publication Data
US 2009/0116729 A1 May 7, 2009

(30) Foreign Application Priority Data
Nov. 7, 2007 (TW) ................................. 96141988 A (51) Int. Cl.
*G06M 7/00* (2006.01)
(52) U.S. Cl. ................ 250/206.2; 250/221; 250/559.29; 345/158
(58) Field of Classification Search ............... 250/206.1, 250/206.2, 559.29, 370.1, 221, 203.1–203.6, 250/208.1, 208.2; 382/154; 348/47, 116; 345/157, 158, 180–183
See application file for complete search history.

(56) References Cited

U.S. PATENT DOCUMENTS

| 6,982,407 B2 * | 1/2006 | Hotta ............................. 250/221 |
| 7,205,521 B2 * | 4/2007 | Gruhlke et al. ............ 250/206.2 |

* cited by examiner

*Primary Examiner* — Tony Ko
(74) *Attorney, Agent, or Firm* — Rabin & Berdo, P.C.

(57) ABSTRACT

A three-dimensional position detecting device includes an electromagnetic radiation source, a first sensing module having first sensing elements, and a second sensing module having second sensing elements. The first and the second sensing elements receive different radiation energies from different spatial direction angles generated by the electromagnetic radiation source relative to the first and the second sensing elements, so values of two spatial direction angles of the electromagnetic radiation source relative to the first and the second sensing modules are obtained according to magnitude relationship of the radiation energies received by the first and the second sensing modules. According to matrix operation of two spatial distances from the electromagnetic radiation source to the first and the second sensing modules and the two spatial direction angles, a spatial coordinate position of the electromagnetic radiation source relative to the first and the second sensing modules is obtained.

9 Claims, 12 Drawing Sheets

Providing an electromagnetic wave emitting source for generating electromagnetic waves, a first sensing module having a first base and a plurality of first sensing elements, and a second sensing module having a second base and a plurality of second sensing elements, the first base having a plurality of surfaces on different planes, the first sensing elements being disposed on the surfaces of the first base, the second base having a plurality of surfaces on different planes, and the second sensing elements being disposed on the surfaces of the second base (S1)

S100

Using the first sensing elements for receiving different radiation energies generated by the electromagnetic waves from the electromagnetic wave emitting source from different spatial angles, the normal vector of the first sensing element of the first sensing module being parallel to a reference axis of a spatial coordinate, and the normal vectors of the other first sensing elements of the first sensing module each are relative to the reference axis in order to generate corresponding included angles. Therefore, a first projection transformation matrix is built by the first sensing module relative to the electromagnetic wave emitting source

S102

Selecting the radiation energies that are received by one part of the first sensing elements and are higher than the radiation energies received by the other first sensing elements

S106

The value of a first spatial direction angle of the electromagnetic wave emitting source relative to the first sensing module is figured out according to the matrix operation of the radiation energies received by the one part of the first sensing elements and the first projection transformation matrix built by the first ensing module relative to the electromagnetic wave emitting source

S110

S114

Figuring out a first spatial distance from the electromagnetic wave emitting source to the first sensing module (S2)

FIG. 6C

THREE-DIMENSIONAL POSITION DETECTING DEVICE AND METHOD FOR USING THE SAME

BACKGROUND OF THE INVENTION

1. Field of the Invention

The present invention relates to a direction detecting device and a method for using the same, and particularly relates to a three-dimensional position detecting device and a method for using the same.

2. Description of the Related Art

Figure 1:
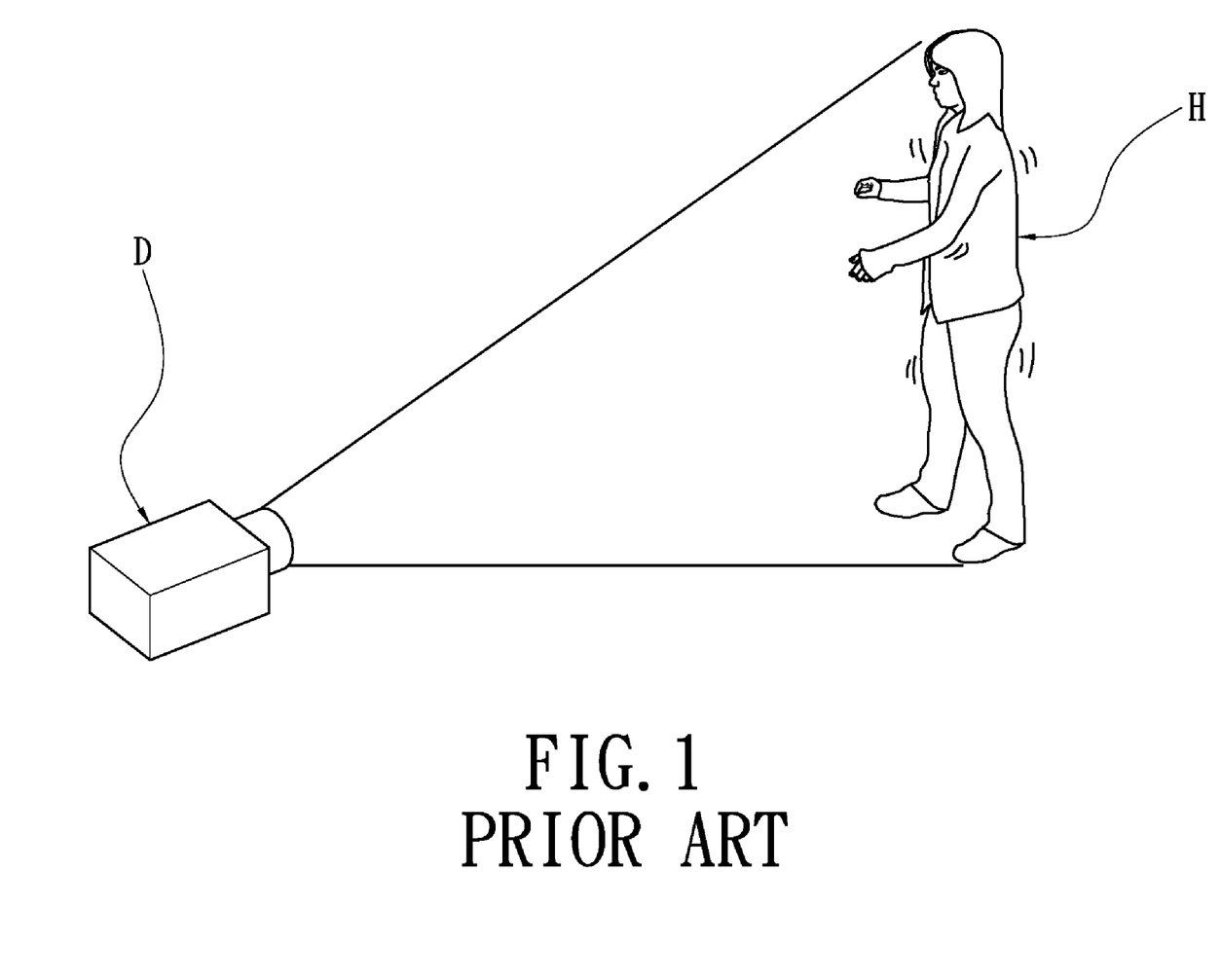
FIG. 1 is a perspective, schematic view of a three-dimensional position detecting device of the prior art.

FIG. 1 shows a perspective, schematic view of a three-dimensional position detecting device of the prior art. The three-dimensional position detecting device of the prior art uses a digital camera D to capture the image information of an object H directly, and then the image information is calculated by an image processing software in order to obtain the position of the object H in space.

However, in the prior art it is inconvenient for user to obtain the position of the object H in space by using both the digital camera D and the image processing software.

SUMMARY OF THE INVENTION

One particular aspect of the present invention is to provide a three-dimensional position detecting device and a method for using the same. The present invention is used to detect three-dimensional direction in space by matching an electromagnetic radiation source for generating electromagnetic radiations, a first sensing module having a plurality of first sensing elements, and a second sensing module having a plurality of second sensing elements.

Moreover, the first sensing elements of the first sensing module and the second sensing elements of the second sensing module are arranged on different planes for respectively receiving different radiation energies generated by the electromagnetic radiations from different spatial angles, so that the values of two spatial direction angles of the electromagnetic radiation source relative to the first sensing module and the second sensing module are obtained according to the magnitude relationship of the radiation energies received by the first sensing module and the second sensing module. Moreover, a spatial coordinate position of the electromagnetic radiation source relative to the first and the second sensing module is obtained according to the matrix operation of two spatial distances from the electromagnetic radiation source to the first sensing module and the second sensing module and the two spatial direction angles of the electromagnetic radiation source relative to the first sensing module and the second sensing module.

In order to achieve the above-mentioned aspects, the present invention provides a three-dimensional position detecting device, including: an electromagnetic radiation source, a first sensing module, and at least one second sensing module. The electromagnetic radiation source is used to generate electromagnetic radiations, wherein the electromagnetic radiation source is a point source. The first sensing module has a plurality of first sensing elements for receiving different radiation energies generated by the electromagnetic radiations from different spatial angles. The at least one second sensing module has a plurality of second sensing elements for receiving different radiation energies generated by the electromagnetic radiations from different spatial angles.

Therefore, the first sensing elements and the second sensing elements respectively receive different radiation energies from different spatial direction angles generated by the electromagnetic radiation source relative to the first sensing elements and the second sensing elements, so that the values of two spatial direction angles of the electromagnetic radiation source relative to the first sensing module and the second sensing module are obtained according to the magnitude relationship of the radiation energies received by the first sensing module and the second sensing module. A spatial coordinate position of the electromagnetic radiation source relative to the first and the second sensing module is obtained according to the matrix operation of two spatial distances from the electromagnetic radiation source to the first sensing module and the second sensing module and the two spatial direction angles of the electromagnetic radiation source relative to the first sensing module and the second sensing module.

In order to achieve the above-mentioned aspects, the present invention provides a method for using a three-dimensional position detecting device, comprising:

(a) providing an electromagnetic radiation source for generating electromagnetic radiations, a first sensing module having a plurality of first sensing elements, and at least one second sensing module having a plurality of second sensing elements, wherein the electromagnetic radiation source is a point source;

(b) using the first sensing elements and the second sensing elements for receiving different radiation energies generated by the electromagnetic radiations from the electromagnetic radiation source from different spatial angles;

(c) obtaining the values of two spatial direction angles of the electromagnetic radiation source relative to the first sensing module and the second sensing module according to the magnitude relationship of the radiation energies received by the first sensing module and the second sensing module; and (d) obtaining a spatial coordinate position of the electromagnetic radiation source relative to the first sensing module and the second sensing module according to the matrix operation of two spatial distances from the electromagnetic radiation source to the first sensing module and the second sensing module and the two spatial direction angles of the electromagnetic radiation source relative to the first sensing module and the second sensing module.

Moreover, the step of (b) to (d) further includes:

building a first projection transformation matrix by the first sensing module relative to the electromagnetic radiation source, wherein the normal vector of the first sensing element is parallel to a reference axis of a spatial coordinate, and the normal vectors of the other first sensing elements each are relative to the reference axis in order to generate corresponding included angles;

building a second projection transformation matrix by the second sensing module relative to the electromagnetic radiation source, wherein the normal vector of the second sensing element is parallel to a reference axis of a spatial coordinate, and the normal vectors of the other second sensing elements each are relative to the reference axis in order to generate corresponding included angles;

selecting the radiation energies that are received by one part of the first sensing elements and are higher than the radiation energies received by the other first sensing elements;

selecting the radiation energies that are received by one part of the second sensing elements and are higher than the radiation energies received by the other second sensing elements;

obtaining the value of a first spatial direction angle of the electromagnetic radiation source relative to the first sensing module according to the matrix operation of the radiation energies received by the one part of the first sensing elements and the first projection transformation matrix built by the first sensing module relative to the electromagnetic radiation source;

obtaining the value of a second spatial direction angle of the electromagnetic radiation source relative to the second sensing module according to the matrix operation of the radiation energies received by the one part of the second sensing elements and the second projection transformation matrix built by the second sensing module relative to the electromagnetic radiation source;

figuring out a first spatial distance from the electromagnetic radiation source to the first sensing module;

figuring out a second spatial distance from the electromagnetic radiation source to the second sensing module; and obtaining the spatial coordinate position of the electromagnetic radiation source relative to the first sensing module and the second sensing module according to the matrix operation of the two spatial distances and the two spatial direction angles.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which:

FIGS. 5A and 5B are a flow chart of a method for using a three-dimensional position detecting device of the present invention;

DETAILED DESCRIPTION OF THE PREFERRED EMBODIMENTS

Figure 2A:
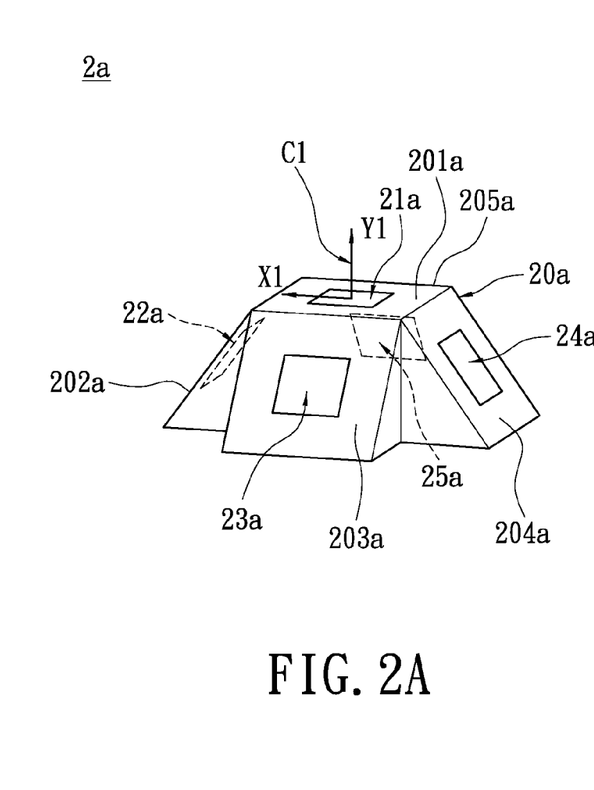
FIG. 2A is a perspective, schematic view of a first sensing module of the first embodiment of the present invention.
Figure 2B:
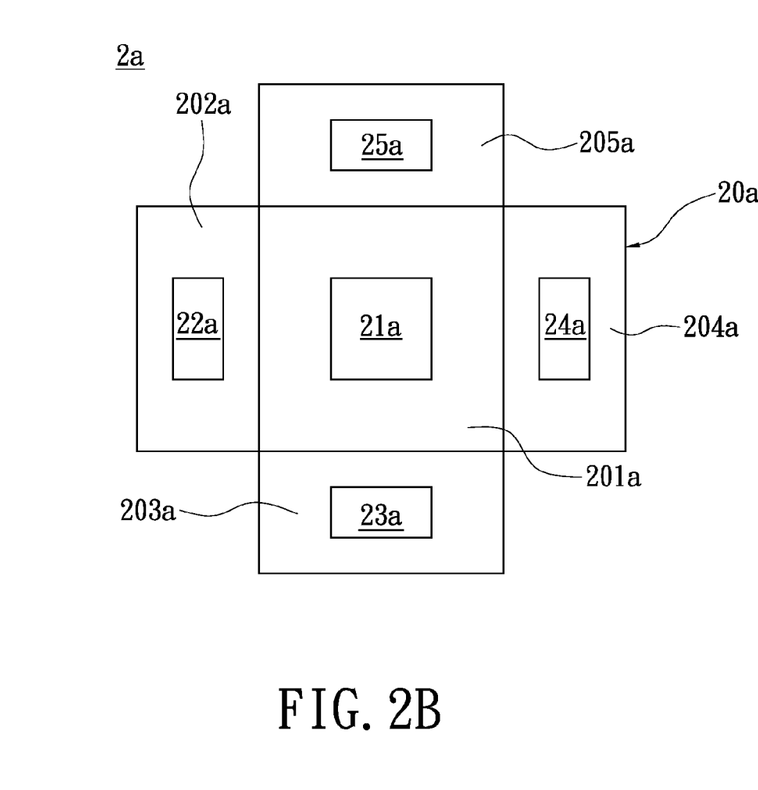
FIG. 2B is a top, schematic view of a first sensing module of the first embodiment of the present invention.
Figure 2C:
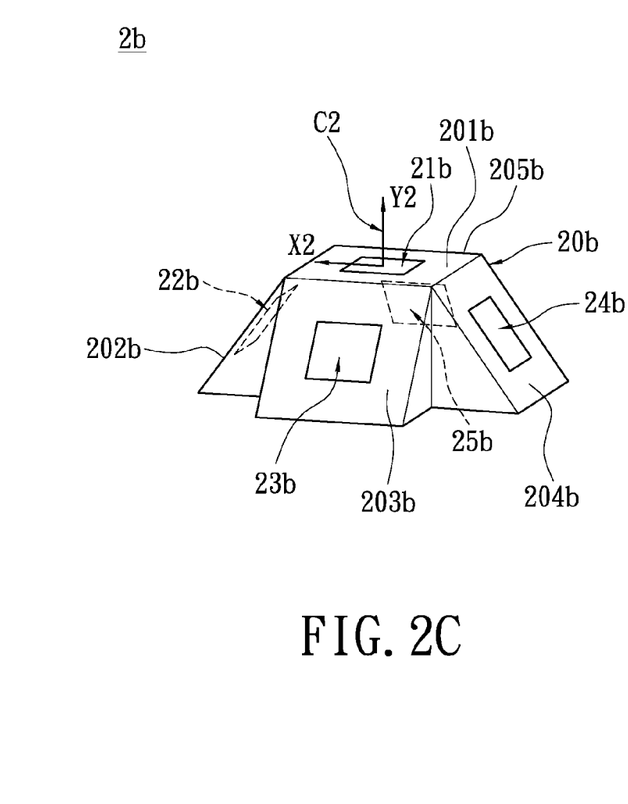
FIG. 2C is a perspective, schematic view of a second sensing module of the first embodiment of the present invention.
Figure 2D:
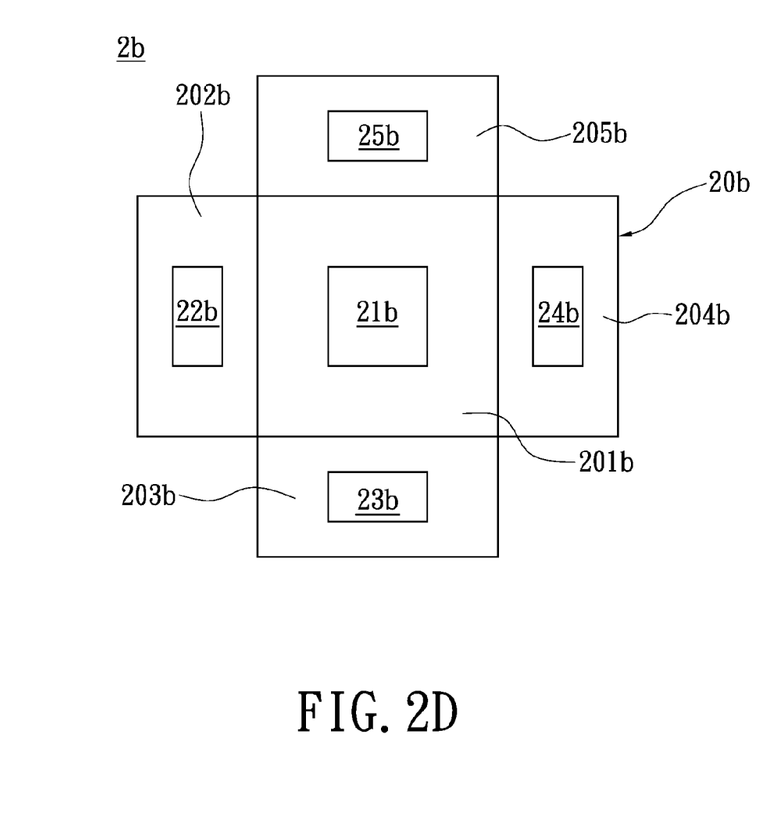
FIG. 2D is a top, schematic view of a second sensing module of the first embodiment of the present invention.
Figure 2E:
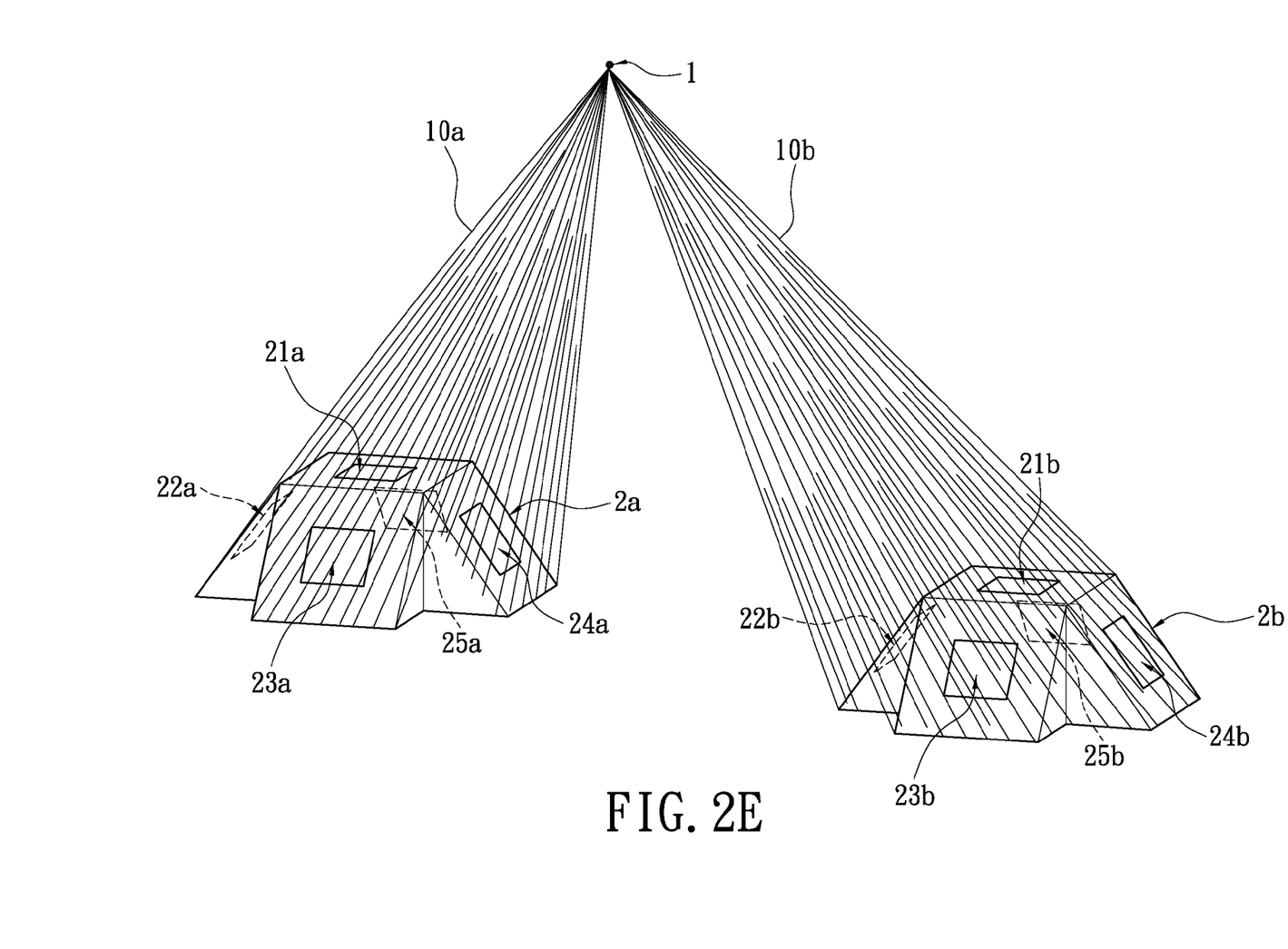
FIG. 2E is a perspective, schematic view of a three-dimensional position detecting device of the first embodiment of the present invention.

Referring to FIGS. 2A to 2E, FIG. 2A shows a perspective, schematic view of a first sensing module of the first embodiment of the present invention; FIG. 2B shows a top, schematic view of a first sensing module of the first embodiment of the present invention; FIG. 2C shows a perspective, schematic view of a second sensing module of the first embodiment of the present invention; FIG. 2D shows a top, schematic view of a second sensing module of the first embodiment of the present invention; FIG. 2E shows a perspective, schematic view of a three-dimensional position detecting device of the first embodiment of the present invention.

The first embodiment of the present invention provides a three-dimensional position detecting device that includes an electromagnetic radiation source 1, a first sensing module 2a, and a second sensing module 2b (It means two or more than two sensing modules can be applied to the present invention).

The electromagnetic radiation source 1 is used to generate electromagnetic radiations (10a, 10b). The electromagnetic radiation source 1 can emit visible light or invisible light; alternatively, the electromagnetic radiation source 1 can be point source. However, above-mentioned embodiments of the electromagnetic radiation source 1 do not used to limit the present invention. Any light source for generating electromagnetic radiations is protected in the present invention.

Referring to FIGS. 2A and 2B, the first sensing module 2a has a first base 20a and five first sensing elements (21a, 22a, 23a, 24a, 25a). The first base 20a has a plurality of surfaces (201a, 202a, 203a, 204a, 205a) on different planes, and the first sensing elements (21a, 22a, 23a, 24a, 25a) are disposed on the surfaces (201a, 202a, 203a, 204a, 205a) of the first base 20a. Hence, from different spatial angles, the first sensing elements (21a, 22a, 23a, 24a, 25a) can receive different radiation energies generated by the electromagnetic radiations 10a from the electromagnetic radiation source 1.

Referring to FIGS. 2C and 2D, the second sensing module 2b has a second base 20b and five second sensing elements (21b, 22b, 23b, 24b, 25b). The second base 20b has a plurality of surfaces (201b, 202b, 203b, 204b, 205b) on different planes, and the second sensing elements (21b, 22b, 23b, 24b, 25b) are disposed on the surfaces (201b, 202b, 203b, 204b, 205b) of the second base 20b. Hence, from different spatial angles, the second sensing elements (21b, 22b, 23b, 24b, 25b) can receive different radiation energies generated by the electromagnetic radiations 10b from the electromagnetic radiation source 1.

However, for example the first sensing module 2a, the design with five first sensing elements (21a, 22a, 23a, 24a, 25a) of the first sensing module 2a is just one embodiment of the present invention. Hence, the number of the sensing elements does not limit the present invention. For example, more than three or five sensing elements can be used in the present invention. Moreover, the disclosure of the first base 20a and the surfaces (201a, 202a, 203a, 204a, 205a) on different planes does not limit the present invention. For example, the surfaces (201a, 202a, 203a, 204a, 205a) can be arranged on the same plane, so that the first sensing elements (21a, 22a, 23a, 24a, 25a) can receive different radiation energies generated by the electromagnetic radiations 10a from different spatial angles by a waveguide.

Furthermore, in the first embodiment, the normal vector of the first sensing element 21a (the normal vector of the first sensing element 21a is a vector that is normal to the first sensing element 21a) of the first sensing module 2a is parallel to a reference axis Y1 of a spatial coordinate C1. The normal vectors of the other first sensing elements (22a, 23a, 24a, 25a) of the first sensing module 2a each are relative to the reference axis Y1 in order to generate corresponding included angles.

Moreover, in the first embodiment, the normal vector of the second sensing element 21b (the normal vector of the second sensing element 21b is a vector that is normal to the second sensing element 21b) of the second sensing module 2b is parallel to a reference axis Y2 of a spatial coordinate C2. The normal vectors of the other second sensing elements (22b, 23b, 24b, 25b) of the second sensing module 2b each are relative to the reference axis Y2 in order to generate corresponding included angles.

However, for example the first sensing module 2a, the description of the normal vector of the first sensing element 21a parallel to the reference axis Y1 of the spatial coordinate C1 does not limit the present invention. For example, according to different requirement the designer can make the normal vector of any one first sensing element parallel to the reference axis Y1 of the spatial coordinate C1, and the normal vectors of the other first sensing elements each are relative to the reference axis Y1 in order to generate corresponding included angles.

Referring to FIG. 2E, the first sensing elements (21a, 22a, 23a, 24a, 25a) of the first sensing module 2a and the second sensing elements (21b, 22b, 23b, 24b, 25b) of the second sensing module 2b respectively receive different radiation energies from different spatial direction angles generated by the electromagnetic radiation source 1 relative to the first sensing elements (21a, 22a, 23a, 24a, 25a) and the second sensing elements (21b, 22b, 23b, 24b, 25b). The radiation energies received by the first sensing module 2a and the second sensing module 2b are luminous flux.

Hence, the values of two spatial direction angles of the electromagnetic radiation source 1 relative to the first sensing module 2a and the second sensing module 2b are obtained according to the magnitude relationship of the radiation energies received by the first sensing module 2a and the second sensing module 2b. In addition, a spatial coordinate position of the electromagnetic radiation source 1 relative to the first sensing module 2a and the second sensing module 2b is obtained according to the matrix operation of two spatial distances from the electromagnetic radiation source 1 to the first sensing module 2a and the second sensing module 2b and the two spatial direction angles of the electromagnetic radiation source 1 relative to the first sensing module 2a and the second sensing module 2b.

Figure 3:
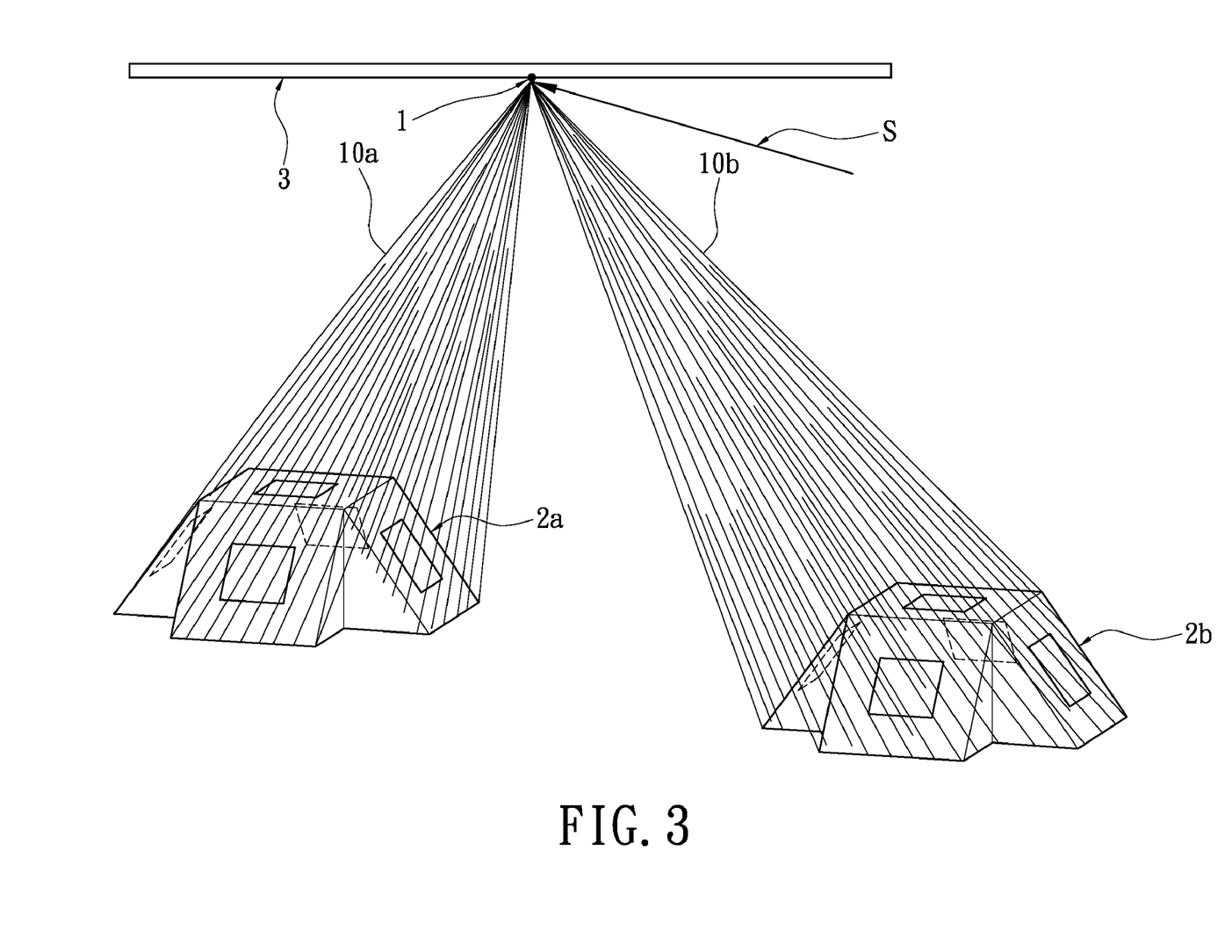
FIG. 3 is a perspective, schematic view of a three-dimensional position detecting device of the second embodiment of the present invention.

FIG. 3 shows a perspective, schematic view of a three-dimensional position detecting device of the second embodiment of the present invention. The difference between the second embodiment and the first embodiment is that: in the second embodiment, the three-dimensional position detecting device further includes a reflective board 3 for reflecting the electromagnetic radiations (10a, 10b) from the electromagnetic radiation source 1 onto the first sensing module 2a and the second sensing module 2b. Hence, the electromagnetic radiations (10a, 10b) of the electromagnetic radiation source 1 are generated by the reflective board 3. In other words, the light source S is arranged on the same side of the first sensing module 2a and the second sensing module 2b, and then the light source S is reflected by the reflective board 3 to generate the electromagnetic radiation source 1 and the electromagnetic radiations (10a, 10b).

Figure 4A:
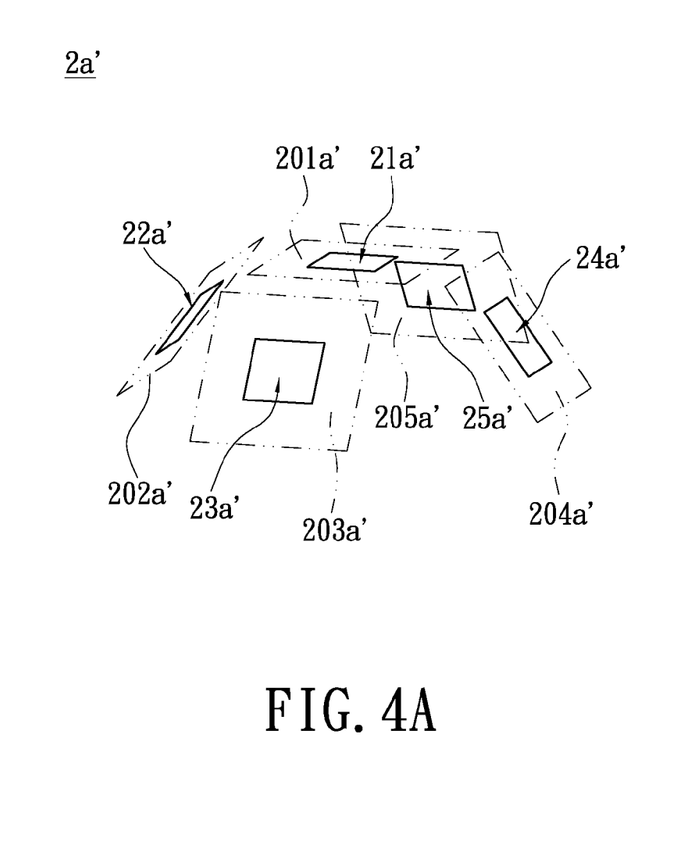
FIG. 4A is a perspective, schematic view of a first sensing module of the third embodiment of the present invention.
Figure 4B:
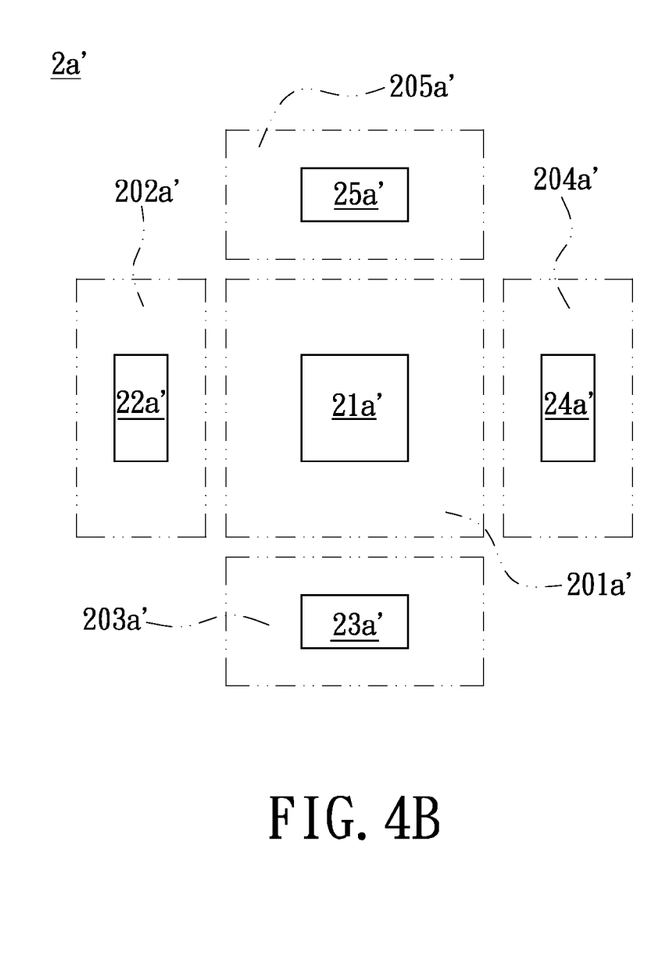
FIG. 4B is a top, schematic view of a first sensing module of the third embodiment of the present invention.
Figure 4C:
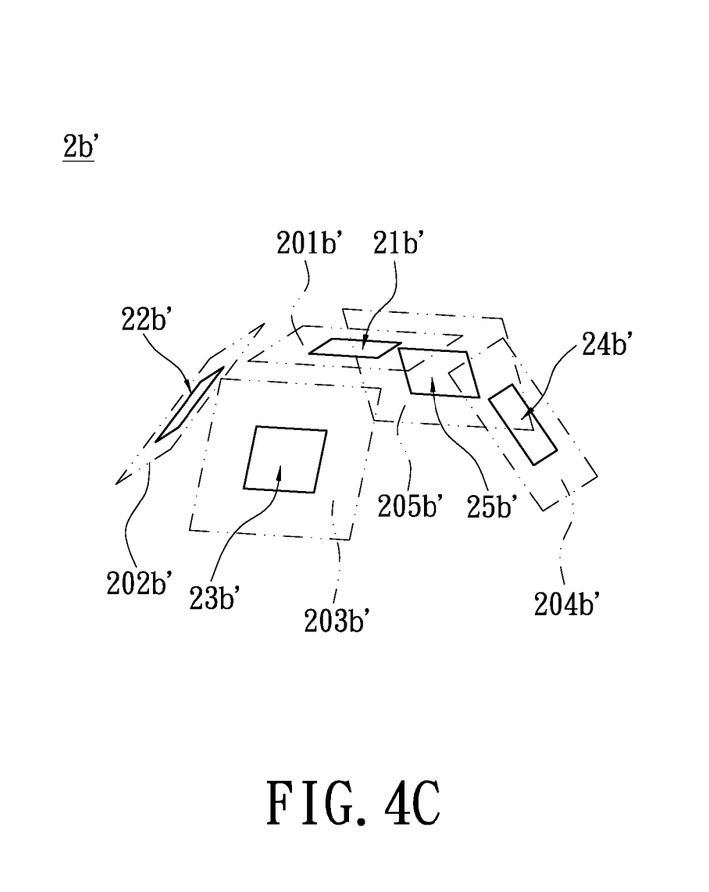
FIG. 4C is a perspective, schematic view of a second sensing module of the third embodiment of the present invention.
Figure 4D:
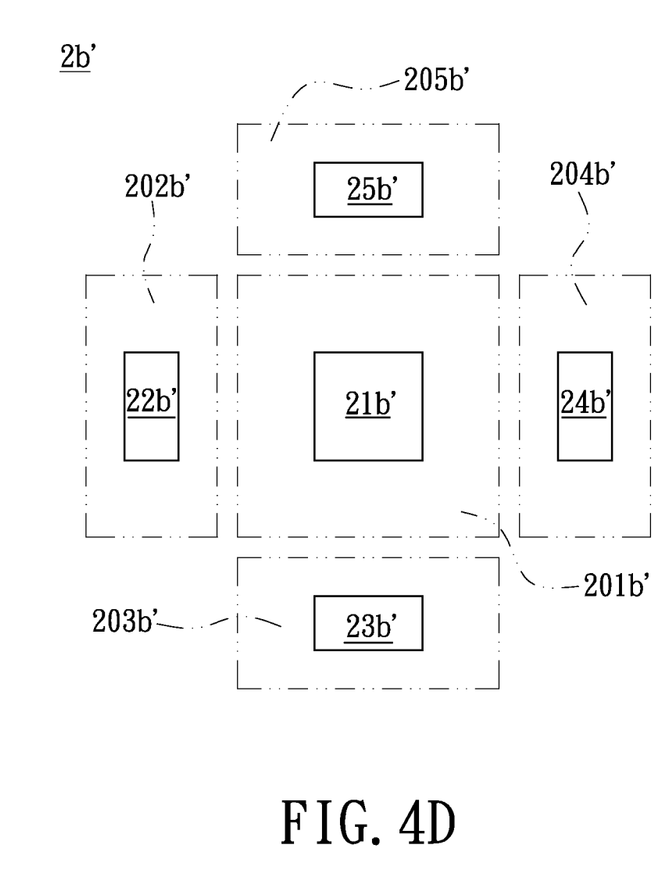
FIG. 4D is a top, schematic view of a second sensing module of the third embodiment of the present invention.
Figure 4E:
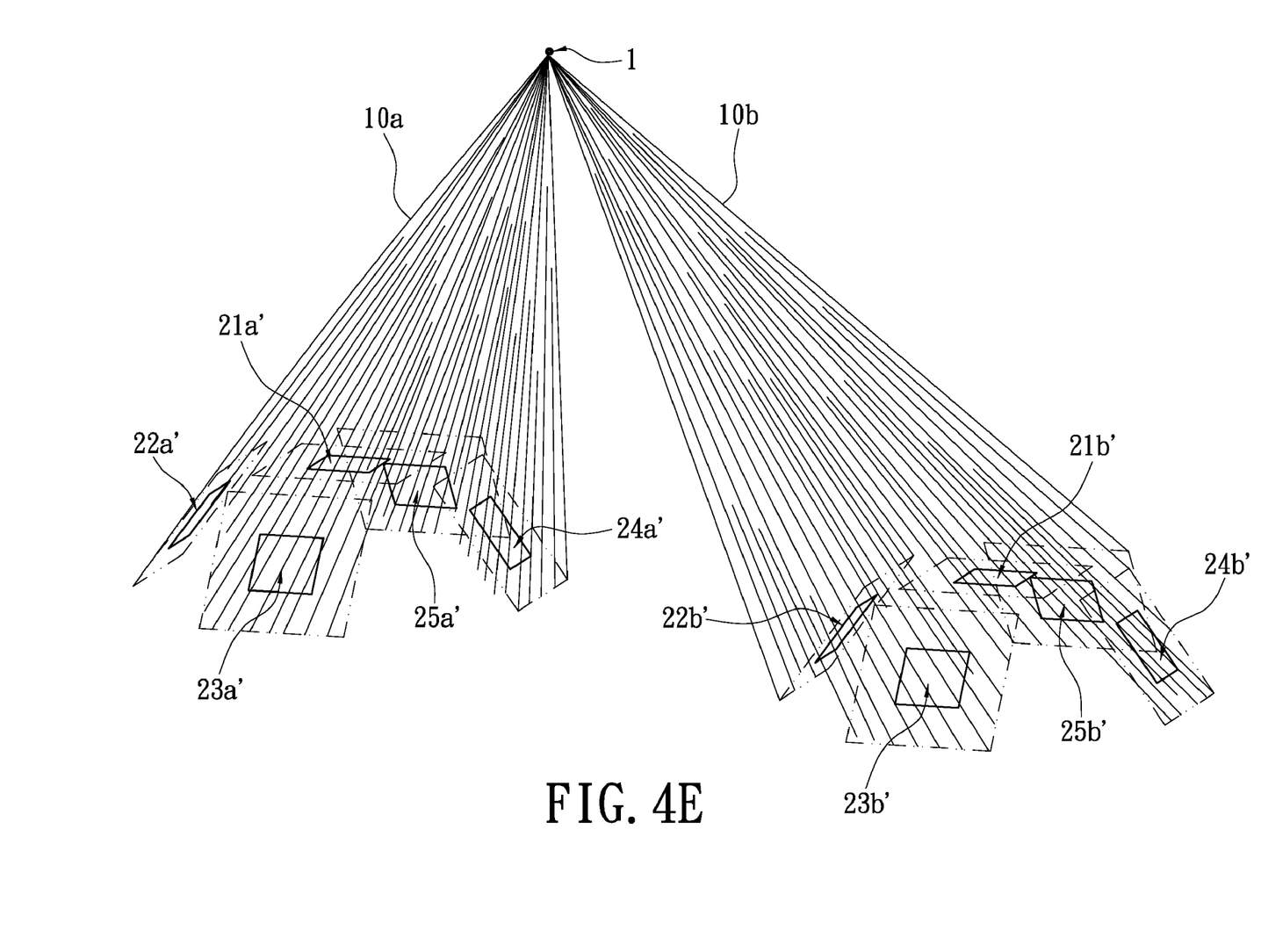
FIG. 4E is a perspective, schematic view of a three-dimensional position detecting device of the third embodiment of the present invention.

Referring to FIGS. 4A to 4E, FIG. 4A shows a perspective, schematic view of a first sensing module of the third embodiment of the present invention; FIG. 4B shows a top, schematic view of a first sensing module of the third embodiment of the present invention; FIG. 4C shows a perspective, schematic view of a second sensing module of the third embodiment of the present invention; FIG. 4D shows a top, schematic view of a second sensing module of the third embodiment of the present invention; FIG. 4E shows a perspective, schematic view of a three-dimensional position detecting device of the third embodiment of the present invention. The difference between the third embodiment and the first embodiment is that: in the third embodiment, the first sensing module 2a' has five first sensing elements (21a', 22a', 23a', 24a', 25a') arranged on different planes (201a', 202a', 203a', 204a', 205a'), and the different planes (201a', 202a', 203a', 204a', 205a') are separated from each other. In other words, according to different requirements, the first sensing elements (21a', 22a', 23a', 24a', 25a') can be arranged on any different planes in spatial space, so that from different spatial angles the first sensing elements (21a', 22a', 23a', 24a', 25a') can receive different radiation energies generated by the electromagnetic radiations 10a from the electromagnetic radiation source 1.

Moreover, in the third embodiment, the second sensing module 2b' has five second sensing elements (21b', 22b', 23b', 24b', 25b') arranged on different planes (201b', 202b', 203b', 204b', 205b'), and the different planes (201b', 202b', 203b', 204b', 205b') are separated from each other. In other words, according to different requirements, the second sensing elements (21b', 22b', 23b', 24b', 25b') can be arranged on any different planes in spatial space, so that from different spatial angles the second sensing elements (21b', 22b', 23b', 24b', 25b') can receive different radiation energies generated by the electromagnetic radiations 10b from the electromagnetic radiation source 1.

Figure 5B:
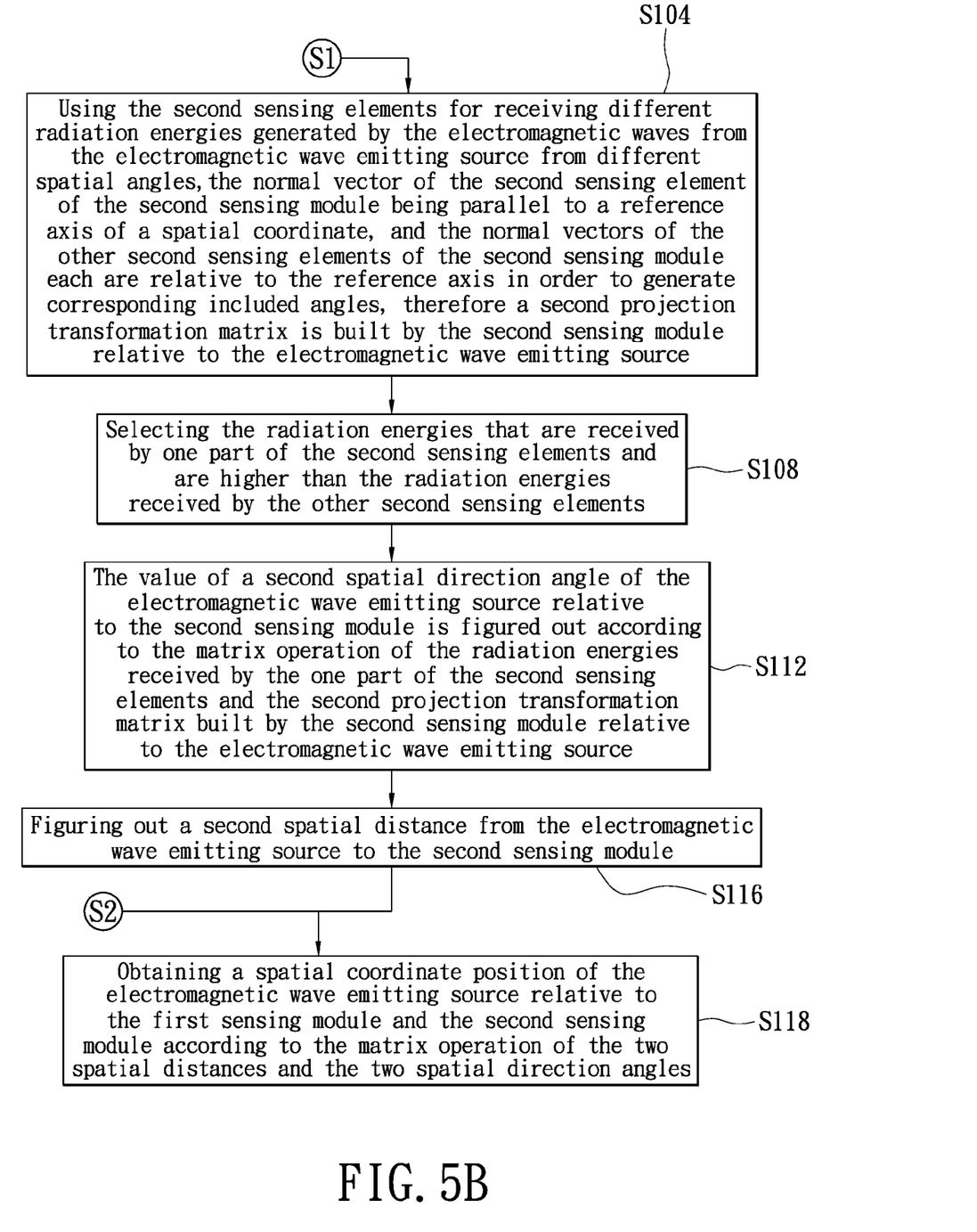

FIGS. 5A and 5B show a flow chart of a method for using a three-dimensional position detecting device of the present invention. The first embodiment of the present invention provides a method for using a three-dimensional position detecting device. The method includes following steps:

Step S100 is: providing an electromagnetic radiation source 1 for generating electromagnetic radiations (10a, 10b), a first sensing module 2a having a first base 20a and a plurality of first sensing elements (21a, 22a, 23a, 24a, 25a), and a second sensing module 2b having a second base 20b and a plurality of second sensing elements (21b, 22b, 23b, 24b, 25b), the first base 20a having a plurality of surfaces (201a, 202a, 203a, 204a, 205a) on different planes, the first sensing elements (21a, 22a, 23a, 24a, 25a) being disposed on the surfaces (201a, 202a, 203a, 204a, 205a) of the first base 20a, the second base 20b having a plurality of surfaces (201b, 202b, 203b, 204b, 205b) on different planes, and the second sensing elements (21b, 22b, 23b, 24b, 25b) being disposed on the surfaces (201b, 202b, 203b, 204b, 205b) of the second base 20b. The electromagnetic radiation source 1 can emit visible light or invisible light; alternatively, the electromagnetic radiation source 1 can be point source.

Step S102 is: using the first sensing elements (21a, 22a, 23a, 24a, 25) for receiving different radiation energies generated by the electromagnetic radiations 10a from the electromagnetic radiation source 1 from different spatial angles, the normal vector of the first sensing element 21a of the first sensing module 2a being parallel to a reference axis Y1 of a spatial coordinate C1, and the normal vectors of the other first sensing elements (22a, 23a, 24a, 25a) of the first sensing module 2a each are relative to the reference axis Y1 in order to generate corresponding included angles. Therefore, a first projection transformation matrix is built by the first sensing module 2a relative to the electromagnetic radiation source 1.

Step S104 is: using the second sensing elements (21b, 22b, 23b, 24b, 25b) for receiving different radiation energies generated by the electromagnetic radiations 10b from the electromagnetic radiation source 1 from different spatial angles, the normal vector of the second sensing element 21b of the second sensing module 2b being parallel to a reference axis Y2 of a spatial coordinate C2, and the normal vectors of the other second sensing elements (22b, 23b, 24b, 25b) of the second sensing module 2b each are relative to the reference axis Y2 in order to generate corresponding included angles. Therefore, a second projection transformation matrix is built by the second sensing module 2b relative to the electromagnetic radiation source 1.

In other words, the first sensing elements (21a, 22a, 23a, 24a, 25a) and the second sensing elements (21b, 22b, 23b, 24b, 25b) respectively receive different radiation energies from different spatial direction angles generated by the electromagnetic radiation source 1 relative to the first sensing elements (21a, 22a, 23a, 24a, 25a) and the second sensing elements (21b, 22b, 23b, 24b, 25b). The radiation energies received by the first sensing module 2a and the second sensing module 2b are luminous flux. In addition, for example, in the second embodiment as shown in FIG. 3, the steps S102 and S104 further include using a reflective board 3 for reflecting the electromagnetic radiations (10a, 10b) from the electromagnetic radiation source 1 onto the first sensing module 2a and the second sensing module 2b.

Step S106 is: selecting the radiation energies that are received by one part of the first sensing elements and are higher than the radiation energies received by the other first sensing elements.

Step S108 is: selecting the radiation energies that are received by one part of the second sensing elements and are higher than the radiation energies received by the other second sensing elements.

Step S110 is: the value of a first spatial direction angle of the electromagnetic radiation source 1 relative to the first sensing module 2a is figured out according to the matrix operation of the radiation energies received by the one part of the first sensing elements and the first projection transformation matrix built by the first sensing module 2a relative to the electromagnetic radiation source 1.

Step S112 is: the value of a second spatial direction angle of the electromagnetic radiation source 1 relative to the second sensing module 2b is figured out according to the matrix operation of the radiation energies received by the one part of the second sensing elements and the second projection transformation matrix built by the second sensing module 2b relative to the electromagnetic radiation source 1.

In other words, in the steps of S110 and S112, the values of the two spatial direction angles of the electromagnetic radiation source 1 relative to the first sensing module 2a and the second sensing module 2b are respectively figured out according to the magnitude relationship of the radiation energies received by the first sensing module 2a and the second sensing module 2b.

Step S114 is: figuring out a first spatial distance from the electromagnetic radiation source 1 to the first sensing module 2a.

Step S116 is: figuring out a second spatial distance from the electromagnetic radiation source 1 to the second sensing module 2b.

Step S118 is: obtaining a spatial coordinate position of the electromagnetic radiation source 1 relative to the first sensing module 2a and the second sensing module 2b according to the matrix operation of the two spatial distances and the two spatial direction angles. In other words, the spatial coordinate position of the electromagnetic radiation source 1 relative to the first sensing module 2a and the second sensing module 2b is obtained according to the matrix operation of the two spatial distances (the first spatial distance and the second spatial distance) from the electromagnetic radiation source 1 to the first sensing module 2a and the second sensing module 2b and the two spatial direction angles (the first spatial direction angle and the second spatial direction angle) of the electromagnetic radiation source 1 relative to the first sensing module 2a and the second sensing module 2b.

Figure 6A:
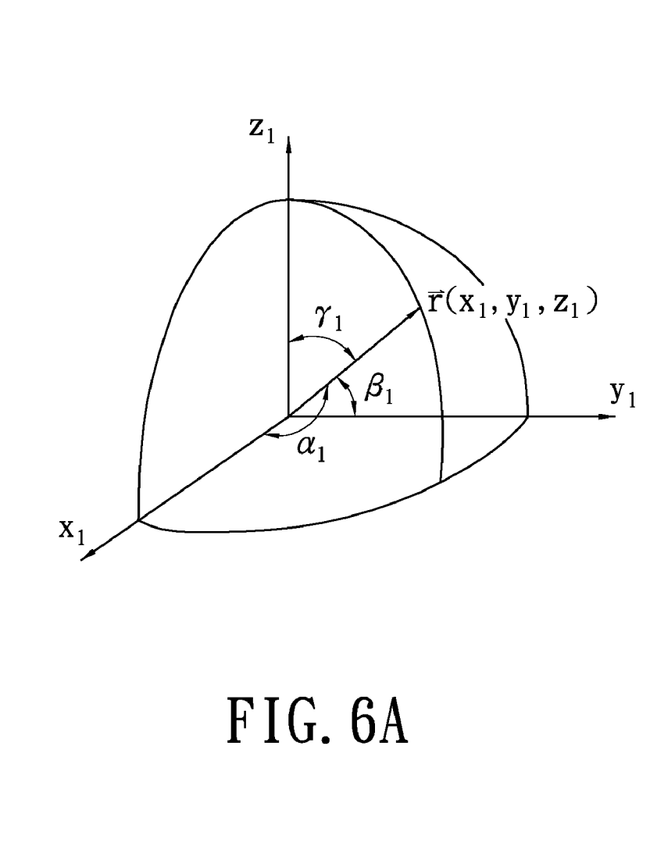
FIG. 6A is a three-dimensional coordinate schematic diagram of an electromagnetic radiation source relative to the first sensing module.
Figure 6B:
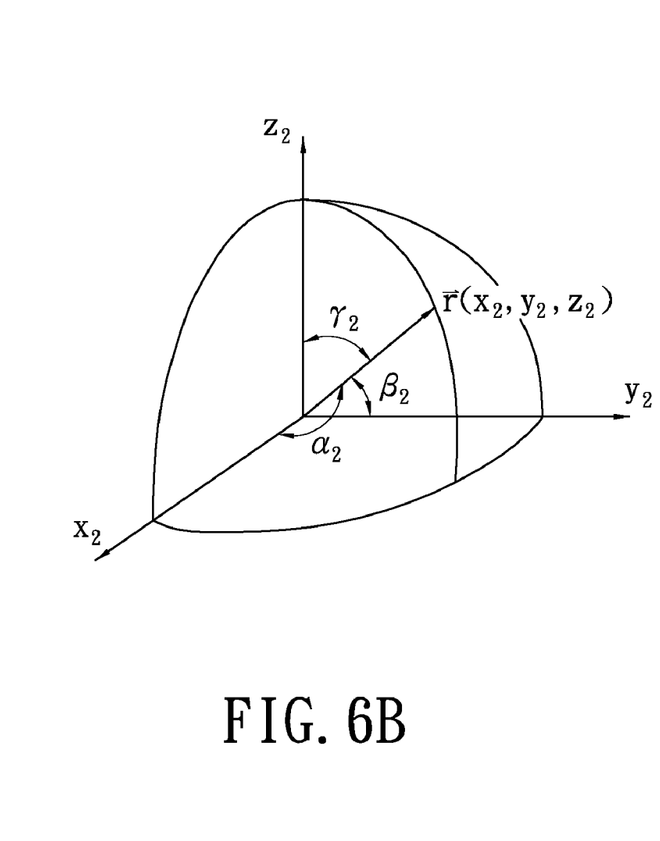
FIG. 6B is a three-dimensional coordinate schematic diagram of an electromagnetic radiation source relative to the second sensing module.
Figure 6C:
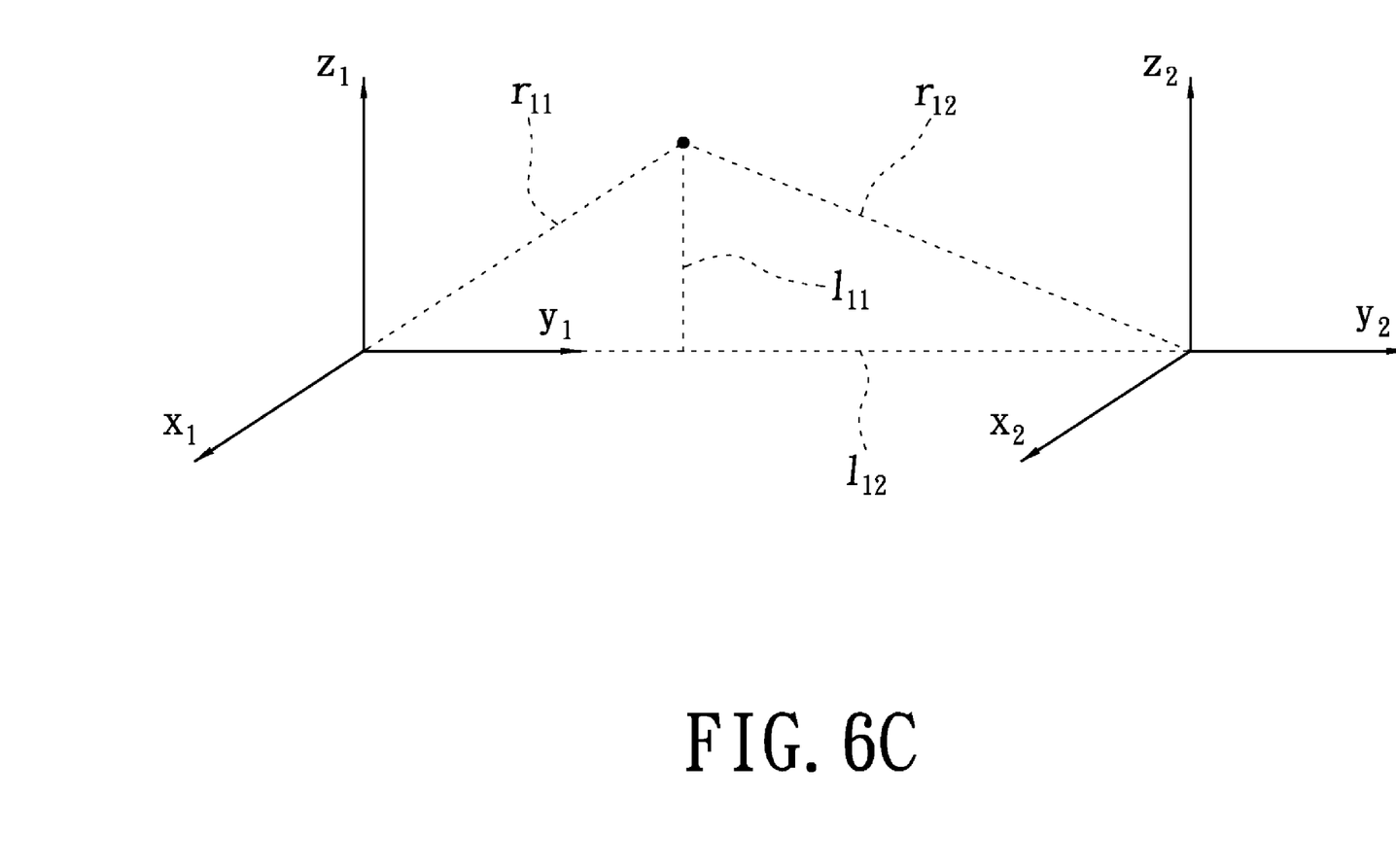
FIG. 6C is a two-dimensional projection coordinate schematic diagram of an electromagnetic radiation source relative to the first sensing module and the second sensing module.

Referring to FIGS. 6A to 6C, FIG. 6A shows a three-dimensional coordinate schematic diagram of an electromagnetic radiation source relative to the first sensing module; FIG. 6B shows a three-dimensional coordinate schematic diagram of an electromagnetic radiation source relative to the second sensing module; FIG. 6C shows a two-dimensional projection coordinate schematic diagram of an electromagnetic radiation source relative to the first sensing module and the second sensing module. The detailed description from the steps S102 to S118 is shown as follows:

Firstly, referring to FIGS. 6A and 6B, $a_{ij}$ f(P, A, r, $\vec{n}$) is defined in order to obtain a first projection transformation matrix built by the first sensing module 2a relative to the electromagnetic radiation source 1 and obtain a second projection transformation matrix built by the second sensing module 2b relative to the electromagnetic radiation source 1.

Moreover, $a_{ij}$=the function of source emitting power;
P=source emitting power;
A=the area of projection;
r=the distance between the source emitting point and the area of projection; and
$\vec{n}$=the normal vector of the area of projection.

Secondly, for example, three radiation energies ($I_1$, $I_2$, $I_3$) being received by one part of the first sensing elements of the first sensing module 2a and being higher than the radiation energies received by the other first sensing elements of the first sensing module 2a are taken out.

Therefore, $$\begin{bmatrix} a_{11} & a_{12} & a_{13} \\ a_{21} & a_{22} & a_{23} \\ a_{31} & a_{32} & a_{33} \end{bmatrix} \begin{bmatrix} b_{11} \\ b_{21} \\ b_{31} \end{bmatrix} = \begin{bmatrix} I_1 \\ I_2 \\ I_3 \end{bmatrix} \Rightarrow AB = I \Rightarrow B = A^{-1}I;$$

Moreover,
A=three-dimensional projection transformation matrix;
B=three-dimensional directional angle matrix; and
I=intensity matrix.

Hence, the value of the first spatial direction angle of the electromagnetic radiation source 1 relative to the first sensing module 2a is figured out according to the matrix operation of the radiation energies received by the one part of the first sensing elements and the first projection transformation matrix built by the first sensing module 2a relative to the electromagnetic radiation source 1.

In other words, because A (the first projection transformation matrix built by the first sensing module 2a relative to the electromagnetic radiation source 1) and I (the radiation energies received by the one part of the first sensing elements) are known, B (three-dimensional directional angle matrix) is obtained. Hence, the value of the first spatial direction angle $b_{ij}=g(\alpha_1, \beta_1, \gamma_1)$ of the electromagnetic radiation source 1 relative to the first sensing module 2a is figured out, and $b_{ij}$ is the function of direction cosine angles of $\alpha_1, \beta_1, \gamma_1$. Using the same calculation way, the value of the second spatial direction angle $b_{ij}=g(\alpha_2, \beta_2, \gamma_2)$ of the electromagnetic radiation source 1 relative to the second sensing module 2b is figured out, and $b_{ij}$ is the function of direction cosine angles of $\alpha_2, \beta_2, \gamma_2$.

Furthermore, referring to FIG. 6C, a first spatial distance from the electromagnetic radiation source 1 to the first sensing module 2a is figured out and a second spatial distance from the electromagnetic radiation source 1 to the second sensing module 2b figured out.

Hence, $$\begin{bmatrix} c_{11} & c_{12} \\ c_{21} & c_{22} \end{bmatrix} \begin{bmatrix} r_{11} \\ r_{12} \end{bmatrix} = \begin{bmatrix} l_{11} \\ l_{12} \end{bmatrix} \Rightarrow CR = L \Rightarrow R = C^{-1}L;$$

Moreover,
C=2D projection transformation matrix;
R=source emitting distance matrix; and
L=sensing module distance matrix.

Because C (2D projection transformation matrix generated by the electromagnetic radiation source 1 relative to the first sensing elements 2a and the second sensing elements 2b) and L (the y-direction distance $l_{11}$ between the first sensing elements 2a and the second sensing elements 2b, and z-direction distance $l_{12}$ from the electromagnetic radiation source 1 to the first sensing elements 2a or the second sensing elements 2b) are known, R (source emitting distance matrix) is obtained. In addition, $r_{11}$ is the first spatial distance from the electromagnetic radiation source 1 to the first sensing module 2a, and $r_{12}$ is the second spatial distance from the electromagnetic radiation source 1 to the second sensing module 2b.

Moreover, a spatial coordinate position of the electromagnetic radiation source 1 relative to the first sensing module 2a and the second sensing module 2b is obtained according to the matrix operation of the two spatial distances (the first spatial distance $r_{11}$ and the second spatial distance $r_{12}$) and the two spatial direction angles (the first spatial direction angle ($\alpha_1, \beta_1, \gamma_1$) and the second spatial direction angle ($\alpha_2, \beta_2, \gamma_2$)). In other words, the spatial coordinate position ($x_1, y_1, z_1$) of the electromagnetic radiation source 1 relative to the first sensing module 2a and the spatial coordinate position ($x_2, y_2, z_2$) of the electromagnetic radiation source 1 relative to the first sensing module 2b respectively are:

$x_1 = r_{11} \cos(\alpha_1), y_1 = r_{11} \cos(\beta_1), z_1 = r_{11} \cos(\gamma_1);$ and $x_2 = r_{12} \cos(\alpha_2), y_2 = r_{12} \cos(\beta_2), z_2 = r_{12} \cos(\gamma_2).$ In conclusion, the present invention provides the first sensing elements of the first sensing module and the second sensing elements of the second sensing module are arranged on different planes for respectively receiving different radiation energies generated by the electromagnetic radiations (10a, 10b) from different spatial angles, so that the values of two spatial direction angles of the electromagnetic radiation source 1 relative to the first sensing module and the second sensing module are obtained according to the magnitude relationship of the radiation energies received by the first sensing module and the second sensing module. Moreover, according to the matrix operation of two spatial distances from the electromagnetic radiation source 1 to the first sensing module and the second sensing module and the two spatial direction angles of the electromagnetic radiation source 1 relative to the first sensing module and the second sensing module, a spatial coordinate position of the electromagnetic radiation source 1 relative to the first sensing module and the second sensing module is obtained.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for using a three-dimensional position detecting device, comprising:
    (a) providing an electromagnetic radiation source for generating electromagnetic radiations, a first sensing module having a plurality of first sensing elements, and at least one second sensing module having a plurality of second sensing elements, wherein the electromagnetic radiation source is a point source;
    (b) using the first sensing elements and the second sensing elements for receiving different radiation energies generated by the electromagnetic radiations from the electromagnetic radiation source from different spatial angles;
    (c) obtaining the values of two spatial direction angles of the electromagnetic radiation source relative to the first sensing module and the second sensing module according to the magnitude relationship of the radiation energies received by the first sensing module and the second sensing module; and
    (d) obtaining a spatial coordinate position of the electromagnetic radiation source relative to the first sensing module and the second sensing module according to the matrix operation of two spatial distances from the electromagnetic radiation source to the first sensing module and the second sensing module and the two spatial direction angles of the electromagnetic radiation source relative to the first sensing module and the second sensing module;
    wherein the step of (b) to the step of (d) further comprises:
    building a first projection transformation matrix by the first sensing module relative to the electromagnetic radiation source, wherein the normal vector of the first sensing element is parallel to a reference axis of a spatial coordinate, and the normal vectors of the other first sensing elements each are relative to the reference axis in order to generate corresponding included angles;
    building a second projection transformation matrix by the second sensing module relative to the electromagnetic radiation source, wherein the normal vector of the second sensing element is parallel to a reference axis of a spatial coordinate, and the normal vectors of the other second sensing elements each are relative to the reference axis in order to generate corresponding included angles;
    selecting the radiation energies that are received by one part of the first sensing elements and are higher than the radiation energies received by the other first sensing elements;
    selecting the radiation energies that are received by one part of the second sensing elements and are higher than the radiation energies received by the other second sensing elements;
    obtaining the value of a first spatial direction angle of the electromagnetic radiation source relative to the first sensing module according to the matrix operation of the radiation energies received by the one part of the first sensing elements and the first projection transformation matrix built by the first sensing module relative to the electromagnetic radiation source;

obtaining the value of a second spatial direction angle of the electromagnetic radiation source relative to the second sensing module according to the matrix operation of the radiation energies received by the one part of the second sensing elements and the second projection transformation matrix built by the second sensing module relative to the electromagnetic radiation source;

figuring out a first spatial distance from the electromagnetic radiation source to the first sensing module;

figuring out a second spatial distance from the electromagnetic radiation source to the second sensing module; and obtaining the spatial coordinate position of the electromagnetic radiation source relative to the first sensing module and the second sensing module according to the matrix operation of the two spatial distances and the two spatial direction angles.

2. The method as claimed in claim 1, wherein the electromagnetic radiation source emits visible light or invisible light.

3. The method as claimed in claim 1, wherein the number of the first sensing elements is at least five.

4. The method as claimed in claim 1, wherein the number of the second sensing elements is at least five.

5. The method as claimed in claim 1, wherein the number of the one part of the first sensing elements is at least three, and the number of the one part of the second sensing elements is at least three.

6. The method as claimed in claim 1, wherein the step of (b) further comprises providing a reflective board for reflecting the electromagnetic radiations onto the first sensing module and the second sensing module.

7. The method as claimed in claim 1, wherein the first sensing module includes a first base that has a plurality of surfaces on different planes, and the first sensing elements are disposed on the surfaces of the first base, and wherein the second sensing module includes a second base that has a plurality of surfaces on different planes, and the second sensing elements are disposed on the surfaces of the second base.

8. The method as claimed in claim 1, wherein the first sensing elements and the second sensing elements are disposed on different planes in space, and the different planes are separated from each other.

9. The method as claimed in claim 1, wherein the first sensing elements and the second sensing elements are disposed on the same plane in space.

* * * * *